United States Patent
Chatras et al.

(10) Patent No.: US 8,504,701 B2
(45) Date of Patent: Aug. 6, 2013

(54) METHOD FOR THE MANAGEMENT OF FLOWS BETWEEN APPLIANCES OF A TELECOMMUNICATIONS NETWORK

(75) Inventors: Bruno Chatras, Paris (FR); Olivier Cleuziou, Ivry Sur Seine (FR); Sébastien Prouvost, Toulouse (FR)

(73) Assignee: France Telecom, Paris (FR)

( * ) Notice: Subject to any disclaimer, the term of this patent is extended or adjusted under 35 U.S.C. 154(b) by 192 days.

(21) Appl. No.: 12/086,890

(22) PCT Filed: Dec. 21, 2006

(86) PCT No.: PCT/FR2006/002838
§ 371 (c)(1),
(2), (4) Date: Jan. 13, 2009

(87) PCT Pub. No.: WO2007/077349
PCT Pub. Date: Jul. 12, 2007

(65) Prior Publication Data
US 2009/0172173 A1 Jul. 2, 2009

(30) Foreign Application Priority Data
Dec. 21, 2005 (FR) .................................. 05 13084

(51) Int. Cl.
*G06F 15/16* (2006.01)
(52) U.S. Cl.
USPC ........................ 709/228; 709/204; 709/227
(58) Field of Classification Search
USPC ........................................ 709/224, 228, 227
See application file for complete search history.

(56) References Cited

U.S. PATENT DOCUMENTS

| | | | |
|---|---|---|---|
| 6,650,619 B1 | 11/2003 | Schuster et al. | |
| 7,412,521 B2 * | 8/2008 | Olson et al. | 709/227 |
| 2002/0178237 A1 * | 11/2002 | Sakata | 709/219 |
| 2003/0210649 A1 | 11/2003 | Bondi | |
| 2005/0163126 A1 * | 7/2005 | Bugenhagen et al. | 370/395.2 |

OTHER PUBLICATIONS

Rosenberg J. et al: "SIP: Session Initiation Protocol" IETF Standard, Internet Engineering Task Force, IETE, CH, Jun. 2002, pp. 1-269, XP015009039; ISSN: 0000-0003; Alinea (010)—alinea (10.2.); figure 2.

Niemi Nokia Research Center A: "Session Initiation Protocol (SIP) Event Notification Extension for Notifiation Throttling; draft-niemi-sipping-event-throttle-03.txt" IETF No. 3, Jul. 18, 2005, pp. 1-15, XP015040301 ISSN: 0000-0004 Alinea (001.)—alinea (3.2).

\* cited by examiner

*Primary Examiner* — Kenny Lin
(74) *Attorney, Agent, or Firm* — Knobbe Martens Olson & Bear LLP

(57) ABSTRACT

This method is for managing flows between a first appliance and at least one second appliance, these appliances being designed to operate according to the so-called SIP protocol on a telecommunications network, wherein, the second appliance being preferably registered with the first appliance. The method comprises upon reception of a notifying message related to the loading state of said first appliance sent according to the SIP protocol, the implementing a procedure for spacing communications sent from the second appliance to said first appliance as a function of the loading state of the latter.

17 Claims, 1 Drawing Sheet

METHOD FOR THE MANAGEMENT OF FLOWS BETWEEN APPLIANCES OF A TELECOMMUNICATIONS NETWORK

This application claims priority from PCT/FR2006/002838 filed Dec. 21, 2006, which claims priority from French Application FR 05 13084, filed Dec. 21, 2005, both of which are hereby incorporated by reference in their entirety.

The present invention relates to the management of the flows between appliances of telecommunications networks.

BACKGROUND OF THE INVENTION

In certain situations, it may be necessary to limit the communications sent to a given appliance when the latter is in a loading state such that it cannot cope with the various demands without degrading its processing times to a point which becomes prejudicial to the quality of the service rendered. The implementation of such a limitation is commonly called "call spacing" or "communication spacing".

There exist today various solutions in which a congested appliance can dynamically control the implementation of a communication spacing procedure.

For example, in the case of switched telephone networks (STNs) and integrated services digital networks (ISDNs), provision is made for the possibility of a switch being able to indicate its loading state to other switches by means of messages exchanged at the message transport sub-system (MTSS) level so long as the congestion lasts. The receipt of messages of this type by a switch brings about a staggered reduction in the traffic sent to the congested switch until the receipt of these MTSS messages disappears.

Provision is also made to be able to integrate into these communications between switches a parameter indicating a loading level, for example, a high or low level.

The INAP (Intelligent Network Application Part) protocol, implemented in intelligent-network architectures, provides for interaction between two particular appliances ensuring respectively the functions of service access switch and services control point. A procedure allows the service control points to ask the service access switches to space out their triggering requests.

In another protocol termed "Megaco/H.248", provision is made for a control message sent from a media gateway to a controller so that the controller spaces out the requisitions sent to a congested gateway.

Finally, in the so-called SIP protocol (Session Initiation Protocol), an entity which cannot process a request on account of a loading state can so indicate by rejecting this request with a specific cause of failure and can, in this rejection message, indicate a lag to be complied with before sending a new requisition to this entity.

The IETF document RFC 3265 describes a mechanism for managing events, within the SIP framework, using the SUBSCRIBE and NOTIFY messages and allowing asynchronous notification of events. The implementation of such a service based on the SIP protocol involves the cooperation of two appliances forming end nodes connected to the network. These services comprise automatic user callback (on the release of a call line previously called), notification of the presence of a user, notification to a user of the posting of a message in a voice box of the user, etc.

This application is limited however to appliances forming end nodes and to specific cases.

However, the existing schemes present a certain number of drawbacks.

First of all, most of them are adapted for allowing the spacing of the communications between two particular appliances identified in advance, thus rendering the system rather unadaptable. Moreover, other solutions such as those implemented within the framework of the SIP protocol are solutions in which the congested appliance can only trigger the communication spacing procedure when it receives a request and is already congested. The generation of the failure message has the effect of increasing its loading.

Additionally, other solutions provide for the development of a particular protocol dedicated to flow management, thus requiring an additional application level in the appliances of the network.

SUMMARY OF THE INVENTION

The aim of the present invention is to solve these various problems by proposing a notification method as well as a corresponding system and programs which make it possible to implement a procedure for spacing communications in a simple and effective manner.

For this purpose, the subject of the present invention is a method for notifying the loading state of a first appliance to at least one second appliance, these appliances being designed to operate according to the so-called SIP protocol on a telecommunications network, comprising:
  a step of registering the second appliance with the first appliance;
  upon modifications of the loading state of said first appliance, a step of sending a loading state notifying message according to the SIP protocol, in the course of which the first appliance spontaneously notifies its loading state to the previously registered second appliance;

Thus, by virtue of the registering of the second appliances, the method of the invention makes it possible to later implement a communication spacing procedure on any already deployed network. Moreover, the spontaneous sending of a message by the first appliance, when it is congested, avoids an overload at the instants of congestion.

The present invention therefore consists in applying a mechanism for managing events to the management of an event relating to an internal appliance of the network, within the framework of a tie-up between appliances. The managed event, defined for the execution of the mechanism for managing events, is the loading. In the invention, the mechanism for managing events is applied outside the framework of the implementation of a service based on the SIP protocol and cooperation between two end terminals, as described by RFC 3265. Its first application is diverted. The implementation of the invention requires the integration, into the appliance apt to be congested and into the entities dialoguing with it, of an SIP server user agent function and of SIP customer user agent functions respectively.

According to other embodiments of the invention:
  said registering step comprises the placing in memory, in said first appliance, a list of said second appliances;
  said registering step comprises the automatic registering, by said first appliance, of second appliances with which it communicates in the course of its operation;
  said registration requests are messages of the SUBSCRIBE type and said state notifying messages are messages of so-called NOTIFY type;
  said state notifying messages are messages of so-called MESSAGE type;
  said notifying message comprises communication spacing parameters directly usable by said second appliances;

the communication spacing parameters comprise at least one of the elements of the group comprising a minimum duration between the requests to establish a session, a minimum duration between the requests for an autonomous transaction, a maximum number of requests per time interval and a maximum throughput of flows;

the first appliance sends messages notifying its loading state when at least one parameter defining its loading state crosses a predetermined threshold.

The invention also relates to a method for managing flows between a first appliance and at least one second appliance, these appliances being designed to operate according to the so-called SIP protocol on a telecommunications network, wherein, the second appliance being prealably registered with the first appliance, the method comprises upon reception of a notifying message related to the loading state of said first appliance sent according to the SIP protocol, the implementing a procedure for spacing communications sent from the second appliance to said first appliance as a function of the loading state of the latter.

According to other embodiments:

said registering step comprises the sending of registration requests by each of said second appliances to said first appliance;

said notifying message comprises an information cue regarding the loading state of said first appliance, the method furthermore comprising a step of determining by each of said second appliances of communication spacing parameters as a function of this loading state information cue;

various types of communications can be sent by said second appliances to said first appliance, the spacing of these communications being effected as a function of their type;

the method comprises the registering of a plurality of second appliances with the first appliance, the spacing parameters applied respectively by said second appliances being independent of one another;

The invention also pertains to an appliance operating according to the so-called SIP protocol on a telecommunications network, characterized in that it comprises:

means for registering at least one other appliance of the network; and means for sending messages notifying its loading state according to the SIP protocol, for the attention of each of said other appliances upon modifications of its loading state, with a view to a spacing of communications sent by these other appliances to it.

The invention also pertains to an appliance operating according to the so-called SIP protocol on a telecommunications network, characterized in that it comprises:

means for receiving messages notifying the loading state of a particular appliance, sent according to the SIP protocol; and means for spacing communications sent to said particular appliance as a function of the loading state of the latter.

Finally, the invention pertains to a system for managing flows between appliances such as defined previously and to the corresponding computer programs.

BRIEF DESCRIPTION OF THE DRAWINGS

Other advantages of the invention will become apparent on reading the claims, the description and the drawings in which:

DESCRIPTION OF PREFERRED EMBODIMENTS

Figure 1:
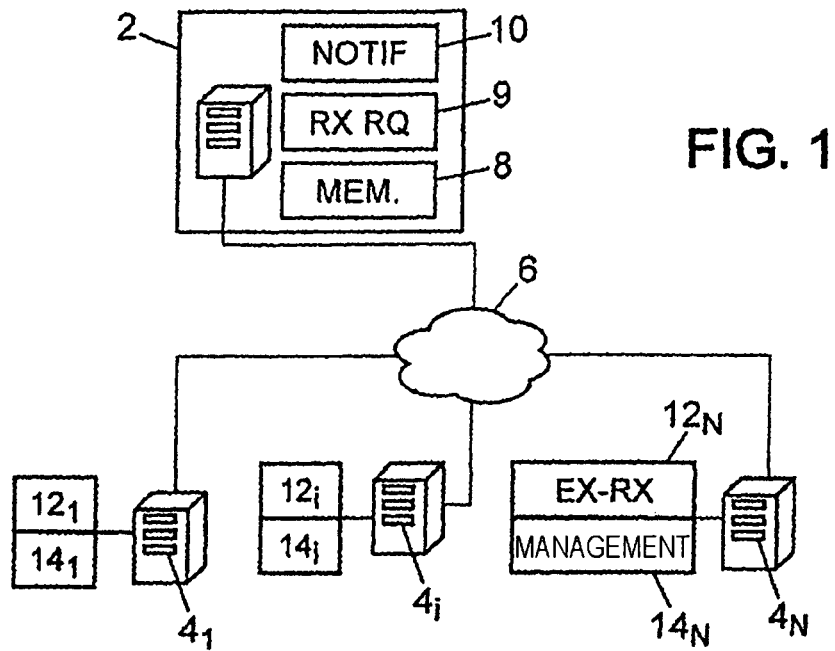
FIG. 1 is a schematic diagram of a system according to the invention.

The system represented with reference to FIG. 1 comprises a first appliance 2 linked to a plurality of second appliances $4_1$ to $4_N$ by a telecommunications network 6 such as the Internet network. In the embodiment described, these appliances are servers.

Each of the servers 2 and $4_1$ to $4_N$ uses the SIP protocol (Session Initiating Protocol) such as defined by the I.E.T.F. in R.F.C. 2543 which allows the establishment, modification and termination of multimedia sessions in a network operating according to the IP Internet protocol. The SIP protocol also allows procedures for notifying events and the dispatching of information outside of the context of a session, so that this protocol is widely used for instantaneous-messaging service commands.

Thus, in an SIP environment, there exist various types of communications such as session setup requests as well as requests exchanged outside of any dialog and not necessarily creating an SIP dialog, which are then designated by the term autonomous transaction requests.

Consequently, within the framework of the operation of the SIP protocol, one and the same appliance may find itself requisitioned in respect of a larger number of dialogs or messages than it would have been in other architectures.

The first server 2 is, in the embodiment described, the appliance apt to enter a state of congestion.

In addition to conventional means (not represented) for communicating over the network 6, this first server 2 comprises:

a memory 8 intended to contain a list of appliances to be notified;

a module 9 for receiving registration requests emanating from the appliances to be notified, able to store data relating to them in the memory 8; and a state notification module 10, designed to send messages notifying the state of the appliance 2.

In a corresponding manner, each of the second servers $4_1$ to $4_N$ comprises a module $12_1$ to $12_N$ for communicating over the network 6, in particular designed to send registration requests to the appliance 2 and to receive notifications regarding the loading state of the appliance 2.

Each of the servers $4_1$ to $4_N$ also comprises a flow manager $14_1$ to $^{14}N$ managing in particular the flow destined for the first server 2 and designed to implement a communication spacing procedure and to terminate same, on receiving loading state notifications originating from the server 2.

Figure 2:
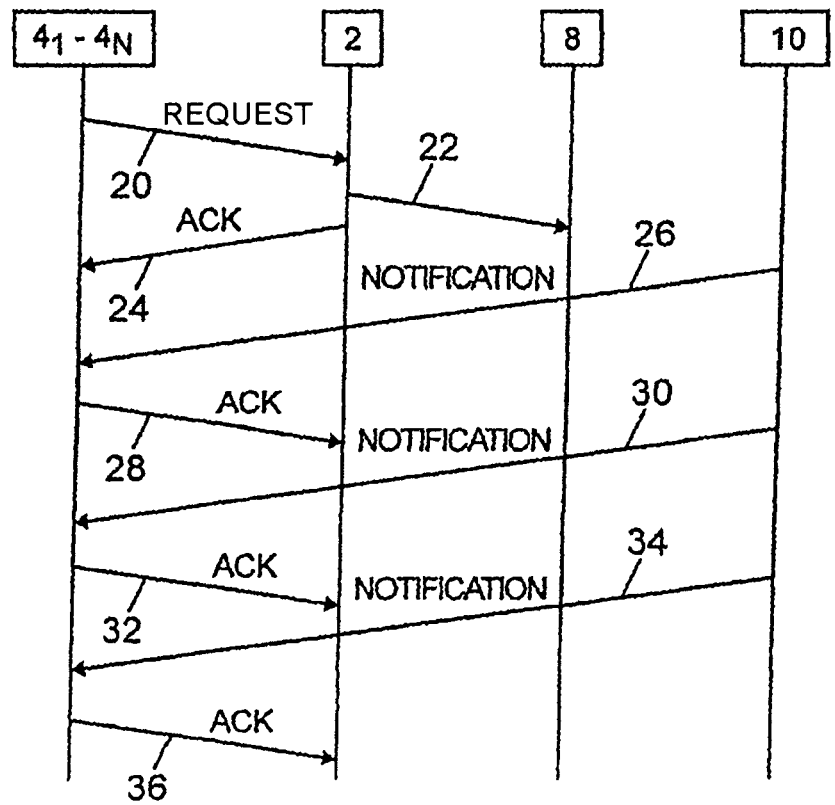
FIG. 2 represents the method of the invention in the form of a chart of flows between the various appliances of the system of FIG. 1.

With reference to FIG. 2, the method of the invention as implemented in the system of FIG. 1 will now be described.

The method starts with a step 20 in the course of which the servers $4_1$ to $4_N$ each send a registration request to the first appliance 2. The registration request is formulated in the SIP protocol in the manner represented in table 1 below.

TABLE 1

SUBSCRIBE sip: AS@service.francetelecom.com SIP/2.0
To: <sip: AS@service.francetelecom.com>
From: <sip: CS@francetelecom.com>
Contact: <sip: CS@CS1.francetelecom.com>
Event: call spacing
Accept: application/call-space This message is a SUBSCRIBE message, as defined by the SIP protocol, for subscribing to the notification of an event. In this instance, this message is diverted from its initial use and the event associated with the SUBSCRIBE message corresponds to the congestion of the first server 2.

This is followed by a step 22 in the course of which the appliance 2 stores the address of the appliances $4_1$ to $4_N$ in the memory 8, for example by creating a list of the identifiers of the appliances to be notified of its state.

As a function of the embodiments, the network addresses of the appliances or of the identifiers associated with such addresses are stored directly.

This registering step 22 is followed by a step of acknowledgment 24 and a step 26 of notifying the current state, sent by the server 2 to each new appliance $4_1$ to $4_N$ of the list.

According to the SIP protocol, this initial notification is formulated in the manner represented in table 2 hereinafter.

TABLE 2

NOTIFY sip: CS@CS1.francetelecom.com SIP/2.0
To: <sip: CS@francetelecom.com>
From: <sip: AS@service.francetelecom.com>
Contact: <sip: AS@service1.francetelecom.com>
Event: call spacing
Subscription-State: active
Content-Type: application/call-space
Call space needed: No This message is a NOTIFY message, as defined by the SIP protocol, for notifying the current state of the event corresponding to the congestion of the first server 2. The indication "Call space needed: No" signifies that the spacing of the communications is not necessary, that is to say this is implicitly a notification of a state of non-congestion of the appliance 2.

The appliance 4 responds to this loading state notification by an acknowledgment message in the course of a step 28.

Subsequently, upon modifications of its loading state, the first server 2 addresses a message comprising information dependent on its loading state, or state notification, to each of the registered servers $4_1$ to $4_N$ to request the implementation of a communication spacing procedure during a step 30. The modifications of the loading state are detected for example by the crossing, by certain parameters defining the loading state, of predetermined thresholds.

These thresholds can be chosen so as to respond to a congestion, as in the example described, or so as to forestall or slow down a congestion situation by triggering the implementation of the spacing procedure before the congestion occurs, that is to say before reaching a loading level that is prejudicial to the quality of the service.

This message is transmitted spontaneously by the first server 2, that is to say without it being necessary to previously receive a request originating from one of the second servers $4_1$ to $4_N$.

This notification arises in the embodiment described, in the manner represented in table 3.

TABLE 3

NOTIFY sip: CS@CS1.francetelecom.com SIP/2.0
To: <sip: CS@francetelecom.com>
From: <sip: AS@service.francetelecom.com>
Contact: <sip: AS@service1.francetelecom.com>
Event: call spacing
Subscription-State: active
Content-Type: application/call-space
Call space needed: Yes
Minimum time between requests establishing a dialog: 10
Minimum time between requests for standalone transaction: 99999999
Call space duration: 300

This message is a NOTIFY message as defined by the SIP protocol, for notifying the state of the event corresponding to the congestion of the server 2. The indication "Call space needed: Yes" implicitly signifies that this is a notification of a state of congestion of the appliance 2.

This state notification also indicates various communication spacing parameters specified by the server 2 to the server $4_i$ and directly usable. In this instance, these parameters define a minimum duration between the requests to establish a dialog and a minimum duration between the requests for an autonomous transaction. Thus, the first server 2 asks the servers $4_1$ to $4_N$ to space out the requests establishing an SIP dialog by fixing a lag of 10 seconds and to no longer dispatch any request establishing an autonomous transaction by fixing an infinite lag, so as to prioritize the session setups. This notifying message also indicates, in the example considered, that the duration of validity of this request-spacing petition is 300 seconds.

The receipt of this notifying message triggers the implementation, by the flow managers $14_1$ to $14_N$, of a procedure for spacing the communications to the server 2. The spacing parameters contained in the various notifications dispatched respectively to the various servers $4_1$ to $4_N$ may differ from one server $4_i$ to another, so that each server $4_1$ to $4_N$ manages in an autonomous manner the minimum duration between the messages sent to the first server 2, doing so as a function of the spacing parameters contained in the notifying message received.

The spacing parameters can be common to all the appliances or common to groups or else distinct for each. Depending on case, the same notifying message is addressed to all the appliances or to the appliances of a group, or else distinct messages are dispatched to each appliance. Thus, the spacing parameters respectively dispatched to the second servers $4_1$ to $4_N$ and applied by the latter during the spacing procedure are mutually independent.

An acknowledgment is here transmitted to the first server 2 by each of the servers $4_1$ to $4_N$ during a step 32.

On account of the parameters specified in the loading state notification, subsequently in their operation, the servers $4_1$ to $4_N$ space out the requests to establish new sessions and the autonomous requests. The communications transmitted within the framework of already established sessions are not spaced out.

When the server 2 leaves the congestion state, it dispatches a new state notification so as to terminate the spacing procedure in the course of a step 34. An example of a new notification such as this is represented in table 4.

TABLE 4

NOTIFY sip: CS@CS1.francetelecom.com SIP/2.0
To: <sip: CS@francetelecom.com>
From: <sip: AS@service.francetelecom.com>
Contact: <sip: AS@service1.francetelecom.com>
Event: call spacing
Subscription-State: active
Content-Type: application/call-space
Call space needed: No As previously, this is a NOTIFY message indicating the state of the "congestion" event. The indication "Call space needed: No" indicates the end of the congestion event and implicitly signifies that this is a notification of a state of non-congestion of the appliance 2. After receipt, the servers $4_1$ to $4_N$ respond with an acknowledgment during a step 36.

Thus, by using the existing SIP protocol, the method of the invention can be implemented between any appliances of the network, in particular on account of registration which allows automatic configuration and on account of the absence of an additional application layer.

Additionally, the method of the invention allows a congested appliance to declare its state spontaneously and without waiting to receive a request. This makes it possible to decrease its loading during congestion periods. This advantage is increased by managing the spacing procedure in an autonomous manner at the level of the second appliances.

In another embodiment, the notifying messages sent by the first appliance 2 comprise solely a loading state information cue. In this case, all the second appliances are adapted for locally determining the parameters of the spacing procedure as a function of this loading state information cue. As previously, the respectively determined spacing parameters applied by the second servers $4_1$ to $4_N$ are mutually independent.

Of course, other embodiments of the invention are also possible.

For example, in another embodiment, there is no sending of registration requests initiated by the second appliances.

In a first variant, the first server registers, in the course of its normal operation, the identifiers of all the appliances liable to communicate with it and, upon a modification of its loading state, addresses a notifying message to these appliances.

In a second variant, the first server 2 has a preregistered list of the appliances to be notified.

In these various embodiments, the notifying message can be a message of MESSAGE type as defined by the SIP protocol.

It is also possible to transmit, in the notifying messages, parameters for implementing the spacing procedure other than those described, such as for example a maximum number of requests per time interval, a maximum throughput to be complied with for the flow or the like.

This method can also be implemented whatever the role of the appliance and in particular, with respect to the SIP protocol, the appliances can equally well fulfill the functions of registration server, call server, application server, presence server and can operate by proxy, as user agents, back to back. This spacing procedure can also be implemented on any SIP interface, in particular session control interfaces, interfaces to application servers, interfaces for notifying messages or a user's presence state.

The appliances can equally well be appliances forming intermediate nodes of the network, termed network nodes, or end nodes.

Finally, the invention can also be applied to other protocols. Thus, a state notifying message sent according to the SIP protocol triggers the implementation of a procedure for spacing the communications that are performed according to another protocol such as IP communications.

The means necessary for the implementation of the invention can be embodied in the form of programs or program fragments and in particular, in the form of a computer program for notifying loading state for an appliance operating according to the so-called SIP protocol on a telecommunications network, comprising instructions which, when they are executed by said appliance, induce the latter to:

register at least one other appliance of the network to be notified; and send to the other registered appliance messages notifying its loading state according to the SIP protocol, with the aim of triggering a procedure for spacing communications sent by said other registered appliance, to it.

Or else, in the form of a flow management computer program for an appliance operating according to the so-called SIP protocol on a telecommunications network, comprising instructions which, when they are executed by said appliance, induce the latter to:

send a registration request to a particular appliance; and on receiving a notifying message regarding the loading state of this particular appliance, sent according to the SIP protocol, triggering the implementation of a procedure for spacing communications sent by said appliance ($4_1$ to $4_N$) to said particular appliance.

The invention claimed is

1. A method for notifying a loading state of a first appliance to at least one second appliance, these appliances being designed to operate according to the SIP protocol on a telecommunications network, comprising:

registering the second appliance with the first appliance, wherein registering comprises storing an identification of a network address of said second appliance in a list of second appliances, in a memory of said first appliance; and upon a change to the loading state of said first appliance, spontaneously sending a loading state notifying message to the previously registered second appliance based on the identification of said second appliance stored in said memory of said first appliance, wherein said loading state notifying message is sent without it being necessary to previously receive a request originating from said second appliance, and wherein the loading state notifying message contains at least one communication spacing parameter specified by the first appliance to said second appliance, so as to request said second appliance to implement a procedure for spacing the communications with said first appliance in accordance with said communication spacing parameter.

2. The method as claimed in claim 1, wherein said registering step comprises the sending of registration requests by each of said second appliances to said first appliance.

3. The method as claimed in claim 2, wherein said registration requests are messages of the SUBSCRIBE type and in that said state notifying messages are messages of so-called NOTIFY type.

4. The method as claimed in claim 1, wherein said state notifying messages are messages of so-called MESSAGE type.

5. The method as claimed in claim 1, wherein said notifying message comprises communication spacing parameters directly usable by said second appliances.

6. An appliance operating according to the SIP protocol on a telecommunications network, comprising:

means for registering at least one second appliance of the network, wherein said registering comprises storing an identification of a network address of said second appliance in a list of second appliances, in a memory of said appliance; and means for sending messages notifying its loading state to each of said second appliances spontaneously upon change to its loading state, based on the identification of said second appliance stored in said memory of said appliance, with a view to a spacing of communications sent by these second appliances to it, wherein said loading state notifying message is sent without it being necessary to previously receive a request originating from said second appliance, and wherein the loading state notifying message contains at least one communication spacing parameter specified by the first appliance to said second appliance, so as to request said second appliance to implement a procedure for spacing the communications with said first appliance in accordance with said communication spacing parameter.

7. The appliance as claimed in claim 6, in which the registering means are designed to receive a SUBSCRIBE message subscribing to an event, such as defined by the SIP protocol, the event associated with the SUBSCRIBE message corresponding to the load on the first appliance.

8. The appliance as claimed in claim 6 in which the notifying means are designed to send a NOTIFY message notifying the state of an event, such as defined by the SIP protocol, the event associated with the NOTIFY message corresponding to the load on the first appliance.

9. A system for managing flows between appliances operating according to the SIP protocol on a telecommunications network, comprising:
a first appliance, comprising:
means for registering at least one second appliance of the network, wherein registering comprises storing an identification of a network address of said second appliance in a list of second appliances, in a memory of said first appliance;
means for sending messages notifying its loading state to each of said second appliances spontaneously upon change to its loading state, based on the identification of said second appliance stored in said memory of said first appliance, with a view to a spacing of communications sent by these other appliances to it, wherein said loading state notifying message is sent without it being necessary to previously receive a request originating from said second appliance and wherein the loading state notifying message contains at least one communication spacing parameter specified by the first appliance to said second appliance, so as to request said second appliance to implement a procedure for spacing the communications with said first appliance in accordance with said communication spacing parameter; and
at least one second appliance operating according to the SIP protocol on said telecommunications network, comprising:
means for receiving messages notifying the loading state of said first appliance, sent according to the SIP protocol; and
means for spacing communications sent to said first appliance as a function of the loading state of the latter.

10. A computer program embodied on a non-transitory medium for notifying a loading state for an appliance operating according to the SIP protocol on a telecommunications network, comprising program code instructions which, when they are executed by said appliance, induce said appliance to:
register at least one second appliance of the network to be notified, wherein registering comprises storing an identification of a network address of said second appliance in a list of second appliances, in a memory of said appliance; and
spontaneously send to the second registered appliance messages notifying its loading state, based on the identification of said second appliance stored in said memory of said appliance, with the aim of triggering a procedure for spacing communications sent by said second registered appliance, to it, wherein said loading state notifying message is sent without it being necessary to previously receive a request originating from said second appliance, and wherein the loading state notifying message contains at least one communication spacing parameter specified by the first appliance to said second appliance, so as to request said second appliance to implement a procedure for spacing the communications with said first appliance in accordance with said communication spacing parameter.

11. A computer program embodied on a non-transitory medium for managing the flow for an appliance operating according to the SIP protocol on a telecommunications network, comprising program code instructions which, when they are executed by said appliance, induce said appliance to implement, upon unrequested reception of a loading state notifying message which contains at least one communication spacing parameter, a procedure for spacing communications sent from said appliance to a first appliance as a function of the loading state of the latter.

12. The method according to claim 1, wherein said first appliance sends notifying message related to its loading state when at least one parameter defining its loading state meets a predetermined threshold.

13. A method for managing flows between a first appliance and at least one second appliance, these appliances being designed to operate according to the SIP protocol on a telecommunications network, wherein the method comprises: upon unrequested reception of a notifying message related to the loading state of said first appliance and containing at least one communication spacing parameter, implementing a procedure for spacing communications sent from the second appliance to said first appliance as a function of the loading state of the latter.

14. The method as claimed in claim 13, wherein said notifying message comprises a loading state information cue regarding the loading state of said first appliance, the method furthermore comprising a step of determining by each of said second appliances of communication spacing parameters as a function of this loading state information cue.

15. The method as claimed in claim 14, wherein various communication types can be sent by said second appliance to said first appliance, the spacing of the communications being effected as a function of their type.

16. An appliance operating according to the SIP protocol on a telecommunications network, comprising:
a component configured to register at least one second appliance of the network, wherein said registering comprises storing an identification of a network address of said second appliance in a list of second appliances, in a memory of said appliance; and
a component configured to send messages notifying its loading state to each of said second appliances spontaneously upon change to its loading state, based on the identification of said second appliance stored in said memory of said appliance, with a view to a spacing of communications sent by these second appliances to it, wherein said loading state notifying message is sent without it being necessary to previously receive a request originating from said second appliance, and
wherein the loading state notifying message contains at least one communication spacing parameter specified by the first appliance to said second appliance, so as to request said second appliance to implement a procedure for spacing the communications with said first appliance in accordance with said communication spacing parameter.

17. A system for managing flows between appliances operating according to the SIP protocol on a telecommunications network, comprising:

a first appliance, comprising:
- a component configured to register at least one second appliance of the network, wherein registering comprises storing an identification of a network address of said second appliance in a list of second appliances, in a memory of said first appliance;
- a component configured to send messages notifying its loading state to each of said second appliances spontaneously upon change to its loading state, based on the identification of said second appliance stored in said memory of said first appliance, with a view to a spacing of communications sent by these other appliances to it, wherein said loading state notifying message is sent without it being necessary to previously receive a request originating from said second appliance and wherein the loading state notifying message contains at least one communication spacing parameter specified by the first appliance to said second appliance, so as to request said second appliance to implement a procedure for spacing the communications with said first appliance in accordance with said communication spacing parameter; and at least one second appliance operating according to the SIP protocol on said telecommunications network, comprising:
- a component configured to receive messages notifying the loading state of said first appliance, sent according to the SIP protocol; and
- a component configured to space communications sent to said first appliance as a function of the loading state of the latter.

* * * * *